Oct. 18, 1966    C. E. CHRISTIE    3,279,275
DUAL SPEED DRIVE FOR POWER TAKE-OFFS AND THE LIKE
Filed Dec. 7, 1964

INVENTOR.
C. E. CHRISTIE

BY   John M Nolan

ATTORNEY

United States Patent Office 3,279,275
Patented Oct. 18, 1966

3,279,275
DUAL SPEED DRIVE FOR POWER TAKE-OFFS AND THE LIKE
Craig E. Christie, Cedar Falls, Iowa, assignor to Deere & Company, Moline, Ill., a corporation of Delaware
Filed Dec. 7, 1964, Ser. No. 416,200
3 Claims. (Cl. 74—375)

This invention relates to power transmission devices and more particularly to a dual-speed transmission mechanism having output adapter means which also change the output speed.

The invention has particular utility in power take-off mechanism on farm tractors. In the farm equipment industry, standards have been provided regarding speeds, sizes, and location of the tractor power take-off shaft. Thus, any standardized power take-off driven implement could be powered by any tractor equipped with a standardized power take-off. Originally, the standards established a 6-splined power take-off shaft rotating at a speed of 540 r.p.m. However, new standards have been introduced requiring the use of a 21-splined shaft rotating at 1000 r.p.m. Thus, to allow the newer tractors to drive the older type implements, the tractors must be equipped with means for reducing the 1000 r.p.m. to 540 r.p.m. In addition, means for accommodating the old 6-splined fittings on the implement must also be provided.

To accomplish this, the present invention provides a power take-off mechanism having interchangeable 6-splined and 21-splined output adapters, the power take-off automatically rotating the shaft at 540 r.p.m. when the 6-splined adapter is used and automatically shifting to a speed of 1000 r.p.m. when the 21-splined adapter is used. Thus, an older, lower speed implement cannot be inadvertently connected to the power take-off when it is rotating at the higher speed, thereby protecting the implement from damaging excessive speeds.

U.S. Patent No. 2,968,188, issued January 17, 1961, discloses a mechanism which also accomplishes the above result. The present invention is an improvement in such a device, accomplishing the same result with fewer and simpler parts. The mechanism in the patent relies on spring means to engage and disengage the gears in the mechanism as shifted for operation at a different speed. This could result in difficulty if a larger force than available from the springs were necessary to engage or disengage the gears due to friction between the gear teeth, misalignment of the gears, etc. The present invention overcomes this objection by providing for positive engagement and disengagement of the gears when the output adapters are changed for operation of the power take-off at the alternate speeds.

Accordingly, an object of the present invention is to provide improvements in a power transmission device having interchangeable output adapters whereby the rotational speed of the output shaft is automatically changed when the output shaft is changed.

A more speicfic object is to provide a dual-speed tractor power take-off having alternate interchangeable output adapters, the rotational speed of the power take-off automatically changing when the output adapter is changed.

Another object is to provide such a power transmission mechanism wherein the main output shaft has an axial bore which accommodates means for effecting the change in speed.

Another object is to provide such a main output shaft wherein the axial bore includes a member positively engaged and positioned by the output adapters and attached to means for shifting the gears in the power take-off changing the output speed.

Another object is to provide such a dual speed power take-off in which the output adapter and consequently the output speeds are simple to change.

Still another object is to provide such a power take-off which is compact, and of simple and rugged construction, which can be incorporated on a tractor as original equipment or as an attachment, and which lends itself to trouble free operation.

These and other objects and features of the invention will become apparent from a consideration of the following description and accompanying drawings wherein an embodiment of the invention is disclosed.

Figure 1:
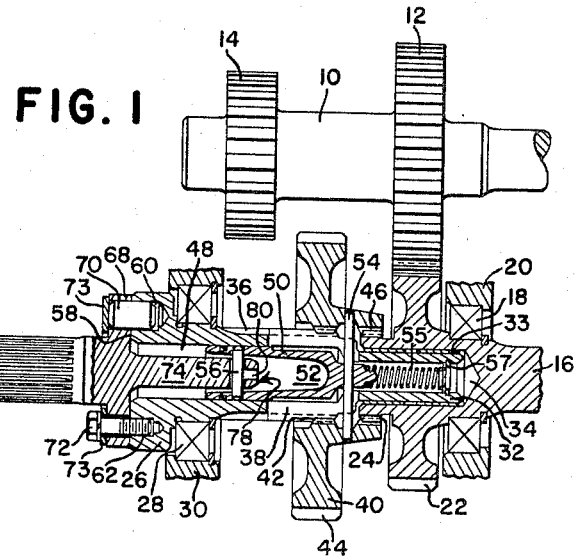
FIG. 1 is a sectional view of the power transmission mechanism with a high-speed output adapter in place and the transmission shifted to produce the higher speed.

Referring now to the drawings, there is shown a power transmission mechanism including a fore-and-aft extending power input shaft 10 carrying a forward input gear 12 and a rear input gear 14. It is to be understood that such words as "front," "rear," "fore,' and "aft," are merely words of convenience used in the interest of clarity and brevity, and are not to be construed as limitations on the orientation of the mechanism or the relative positions of the components.

In a power take-off mechanism, the power input shaft may be driven directly by the tractor engine or by the tractor transmission, all of which is well known in the art.

A front output shaft 16, parallel to the input shaft 10, is journaled in a bearing 18 carried by a front housing 20. The front output shaft rigidly carries a coaxial front output gear 22 in constant mesh with the front input gear 12 to provide a front power take-off shaft rotating at approximately 1000 r.p.m. The rear end portion of the front output shaft 16 includes a clutch element 24, here of the externally toothed type.

A rear output shaft 26 extends coaxially rearwardly from the front output shaft and is journaled in a bearing 28 carried by a rear housing member 30 and also includes a reduced front portion 32 journaled in a sleeve bearing 33 inserted in an axial bore 34 and the rear end of the front output shaft 16. The rear output shaft has a splined portion 36 intermediate its ends traversed by axially extending radial slot means 38.

Figure 2:
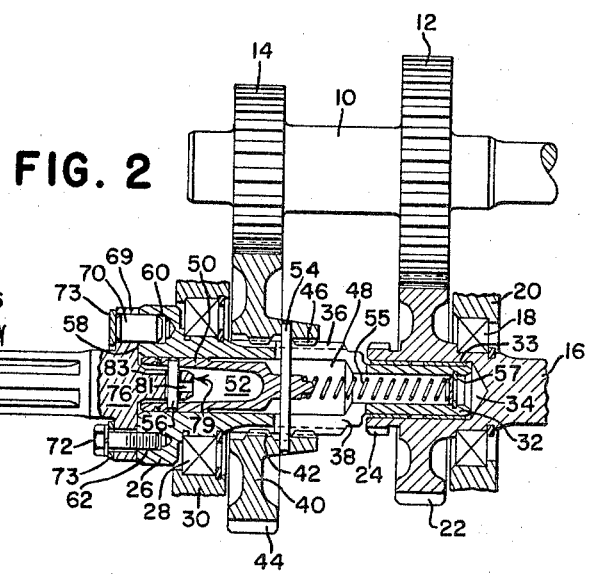
FIG. 2 is a similar sectional view showing the low speed output adapter in place and a transmission shifted to produce the lower speed.

A coaxially combined gear and clutch member 40 is axially slidably mounted on the rear output shaft 26 via the spline 36, having an interior meshing splined fitting 42. The gear part 44 of the member 40 meshes with the rear input gear 14 when the clutch member is in its rear position as shown in FIG. 2, at which time the gear ratios are such that the rear output shaft rotates at 540 r.p.m.

The gear and clutch member 40 also has an internally toothed clutch element 46, which engages clutch element 24 when the member is shifted to its forward position for rotation of the front and rear output shafts 16 and 26 in unison and at 1000 r.p.m. as shown in FIG. 1.

The rear output shaft 26 includes a cylindrical axial bore 48. A cylindrical plunger 50 having an axial bore 52 at its rear end, is slidably mounted in the bore 48 and carries a radial pin 54 which extends through the radial slot means 38 and is attached to the clutch member 40. Thus, the axial position of the clutch member is controlled by the longitudinal movement of the pin 54 or the plunger 50. The pin extending through the slot also maintains the plunger in a fixed rotational position relative to the output shaft 26.

The plunger 50 is biased toward the rear position by a helical compression spring 55 extending axially within the bore 48, one end of the spring seating against a retainer means 57 in the bore 48 and the other end seating against the front end of the plunger. The rear end of the plunger 50 carries a cylindrical pin 56 which is diametrally fixed across the axial bore 52.

The radial rear face 58 of the rear output shaft 26 has a plurality of dowel bores 60 and screw taps 62. Alternate adapters 64 and 66, as shown in FIGS. 1 and 2 respectively, are coaxially attachable to the rear output shaft face 58, each adapter including a front radial flange (68 for the adapter 64, 69 for the adapter 66) which seats against the face 58, the adapter being circumferentially located by means of dowels 70 inserted through the flange into the dowel bores 60 and attached by means of screws 72 inserted through the flange into the screw taps 62. The dowels are held within the dowel bores by retaining brackets 73 which are affixed to the rear end of the dowels and held against the flanges 68 and 69 over the dowels by an adjacent screw 72.

Figure 3:
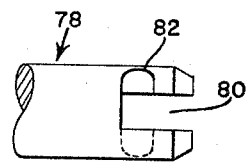
FIG. 3 is an enlarged view of the pin engaging end common to both output adapters.
Figure 4:
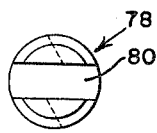
FIG. 4 is an end view of the pin engaging end of the adapter shown in FIG. 3.

The adapter 64 has a relatively long axial shank 74 extending into the bore 48 and the adapter 66 has a relatively short axial shank 76 extending into said bore. The end of the shank 74 for the adapter 64 forms coupling means 78 for engaging the pin 56. The coupling means, as shown more clearly in FIG. 3, comprises a diametral slot 80 extending axially from the end of the shank for receiving the pin 56 when the adapter is rotationally not aligned for attachment to the output shaft 26. The slot terminates in a diametral bore or hook part 82 which is canted relative to said slot and communicates with the slot throughout its length, said bore accommodating the pin when the adapter is aligned for attachment with the output shaft 26, the dowels 70 being insertable through the flange 68 into the dowel bores 60.

The shank 76 of the adapter 66 has identical coupling means, numbered 79 for clarity, including a slot 81 and a diametral bore 83 for engagement with the output shaft pin 56.

The adapters 64 and 66 provide different output members 84 and 86 respectively, having 21- and 6-splines and rotating respectively at 1000 and 540 r.p.m. Each adapter engages the plunger 50 through its respective coupling means 78 and 79. When the adapter 64 is used, as shown in FIG. 1, the longer shank pushes the plunger 50 to its forward position, thereby meshing the clutch elements 24 and 46 for rotation in unison at 1000 r.p.m. Conversely, when the adapter 66 is used, as shown in FIG. 2, the shorter shank portion 76 positions the plunger 50 in its rearward position thereby disengaging the clutch elements 24 and 46 for rotation in unison at 1000 r.p.m. Con- the rear output shaft at 540 r.p.m.

To change from 540 r.p.m. operation to 1000 r.p.m. operation, the screws 72 are removed and the adapter 66 is pulled to the rear, loosening the dowels 70. The rearward motion of the plunger 50 and consequently of the adapter, is limited by the travel of the pin 54 in the slot means 38. After the dowels are loosened, they are removed by pulling rearwardly on the brackets 73. The adapter is then rotated relative to the rear output shaft 26 until the slot 81 is aligned with the pin 56, the pin 54 holding the plunger 50 rotationally immobile to permit the rotation of the adapter relative to the plunger for disengagement of the coupling means 79. The adapter is then completely withdrawn. The adapter 64 is then installed by inserting the shank 74 into the output shaft and engaging the pin 56 with the coupling means 78. The spring 55 holds the plunger 50 to the rear while the coupling is effected. The adapter is then pushed forwardly until its flange 68 seats on the face 58 of the shaft 26, the clutch and gear member 40 simultaneously moving forwardly, disengaging the gears 44 and 14 and meshing the clutch elements 24 and 46. If the clutch elements do not immediately mesh, the adapter may be rotated slightly until the clutch elements slide into engagement. The adapter flange 68 will not seat against the face 58 until the clutch elements are engaged. After the engagement is accomplished, the adapter is rotated slightly, if necessary, to permit the insertion of the dowels 70 and thereafter the screws 72.

The conversion from 1000 r.p.m. operation to 540 r.p.m. operation is similarly accomplished. However, it is to be noted that after the screws 72 are removed, the adapter 64 is withdrawn a sufficient distance to remove the dowels 70, the adapter engaging the brackets 73 which are affixed to the dowels. Since there is a positive connection between the adapter and the clutch member 40 via the pins 56 and 54, this withdrawal assures disengagement of the clutch elements 24 and 46. Although normally the spring 55 would tend to disengage the clutch elements, the positive disengagement insures the disengagement regardless of the axial friction between the teeth of the clutch elements. Similarly the positive connection assures the meshing of the clutch gear 44 with the rear input gear 14. After the adapter 64 is removed, the adapter 66 may be reinstalled, as described above.

As is apparent from the foregoing, the speed of the adapter shaft is controlled by the particular adapter shaft used and it is impossible to inadvertently rotate the particular adapter shaft at the wrong speed.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. A dual speed power take-off mechanism for a tractor or the like having a drive shaft, comprising: a power input shaft adapted to be driven by the drive shaft; a rotatable output shaft including an axial bore; a two-speed drive train between said shafts including a coupling member shiftable into first and second positions to establish first and second speed driving conditions between the shafts; a plunger axially slidable in said bore between first and second positions, a connecting means between the coupling member and the plunger for shifting the coupling member into its alternate positions when the plunger is shifted into its alternate positions; and an output adapter selectively and removably attachable to the output shaft and having a shank portion coaxially extending into the output shaft bore when the adapter is attached to the output shaft and positively engaging the plunger to maintain the plunger in one of its alternate positions.

2. The invention defined in claim 1 and including locking means operably associated with the plunger and the end of adapter shank engaging the plunger to interlock the plunger and adapter for axial movement in unison when the adapter is attached to the output member.

3. The invention defined in claim 2 wherein the locking means is selectively engaged and released by relative rotation of the adapter and the output element when they are unattached and the adapter shank engages the plunger.

References Cited by the Examiner
UNITED STATES PATENTS 2,968,188   1/1961   Du Shane et al. _____ 74—375

MILTON KAUFMAN, *Primary Examiner.*